(No Model.) 3 Sheets—Sheet 1.
M. P. RYDER.
ELECTRIC LAMP FOR VEHICLES.
No. 586,399. Patented July 13, 1897.
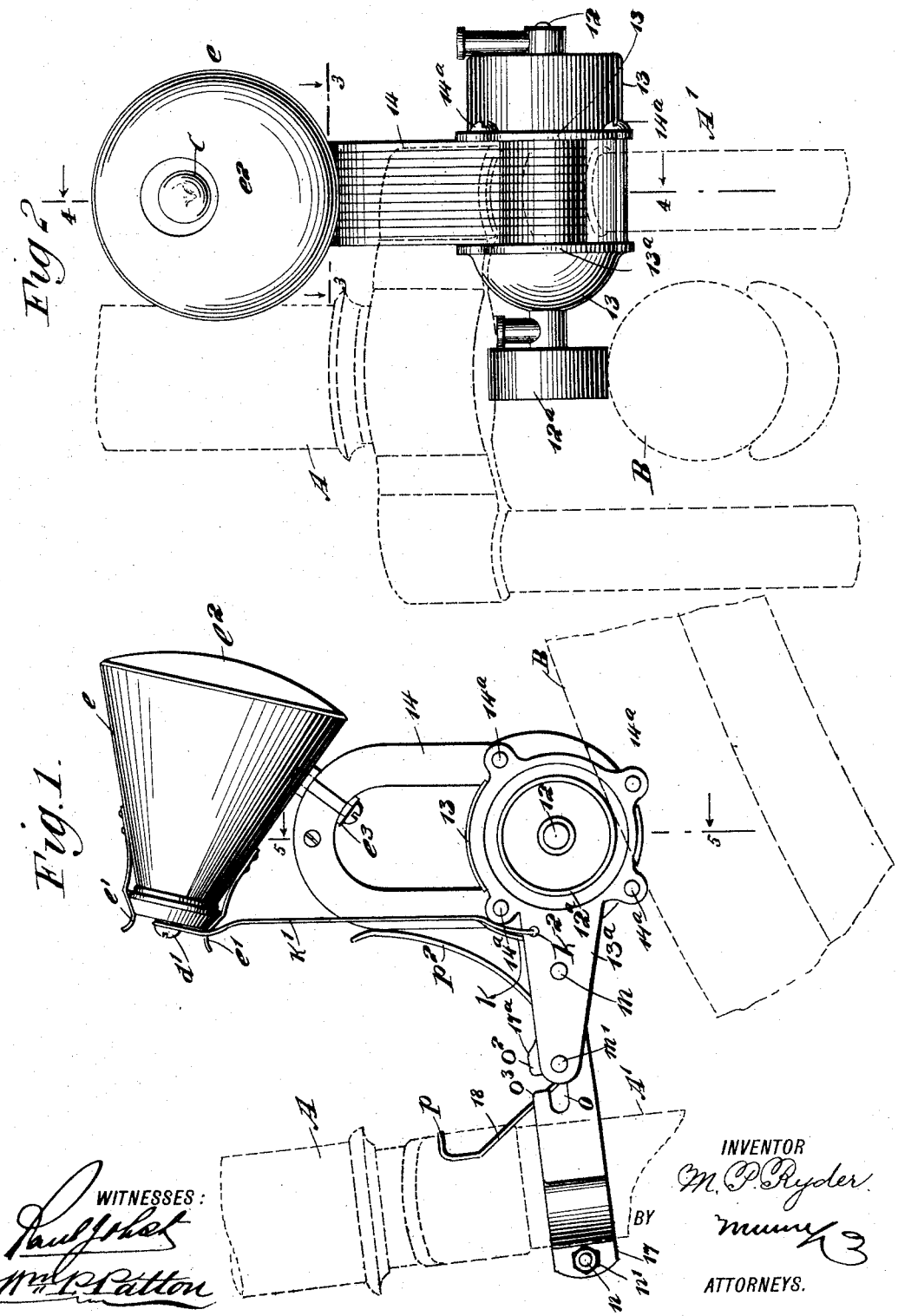
WITNESSES:
INVENTOR
M. P. Ryder
BY
ATTORNEYS.

(No Model.) 3 Sheets—Sheet 2.
M. P. RYDER.
ELECTRIC LAMP FOR VEHICLES.
No. 586,399. Patented July 13, 1897.
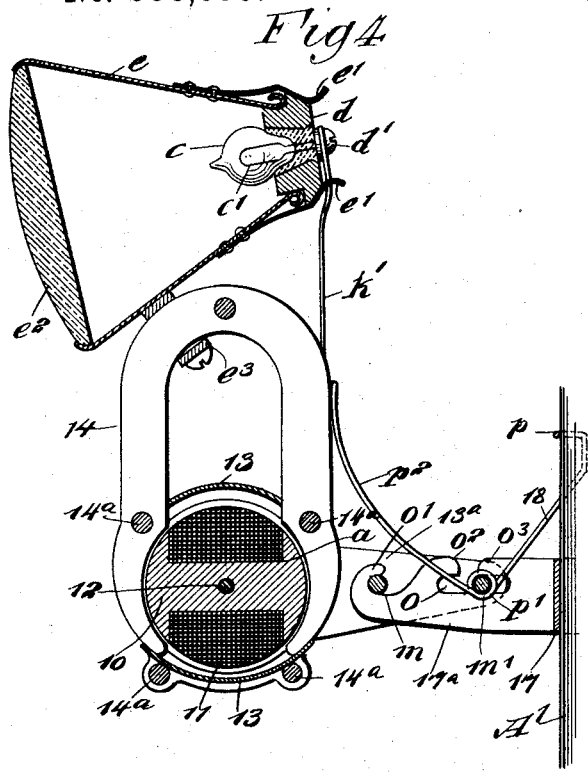
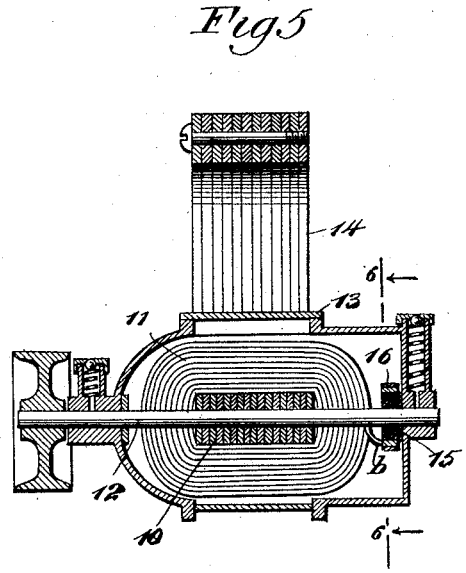
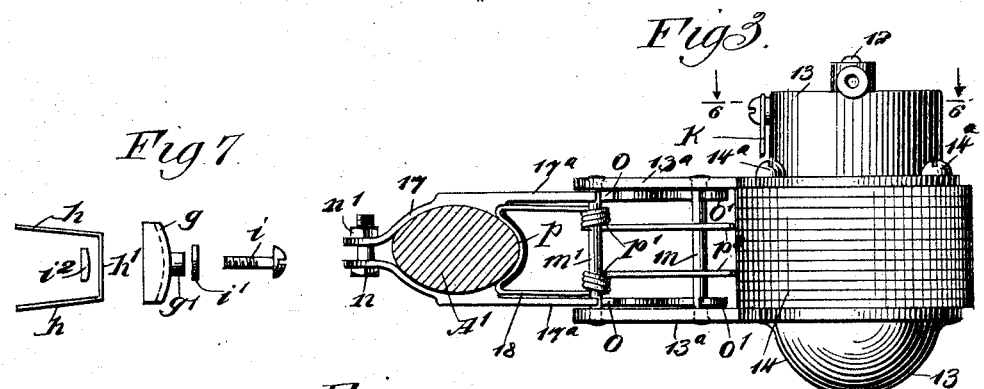
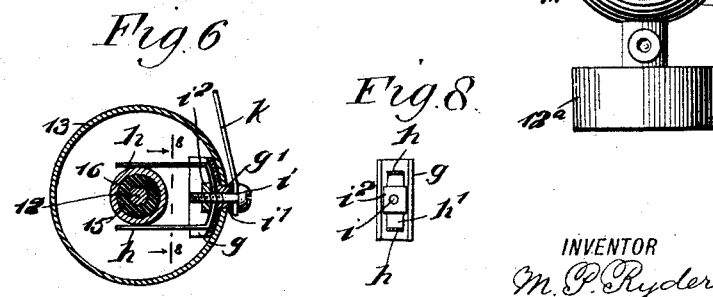
WITNESSES:
INVENTOR
M. P. Ryder
BY
ATTORNEYS.

(No Model.) 3 Sheets—Sheet 3.
M. P. RYDER.
ELECTRIC LAMP FOR VEHICLES.
No. 586,399. Patented July 13, 1897.
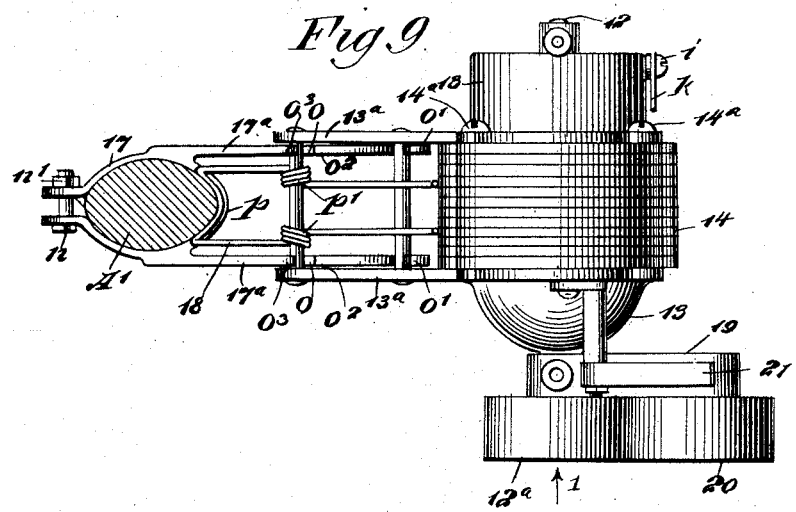
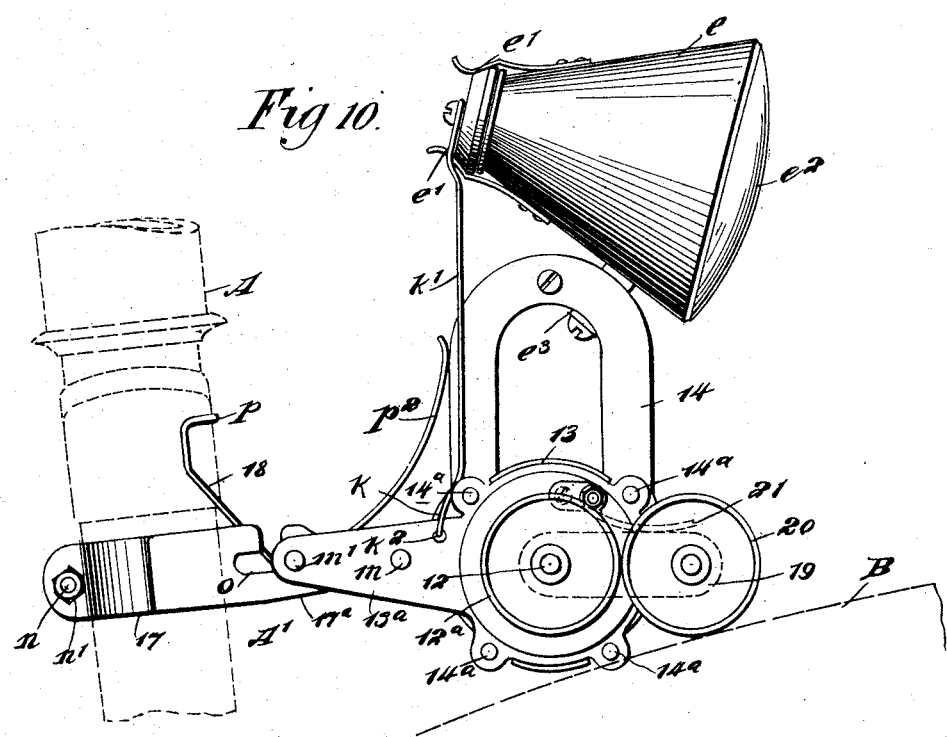
WITNESSES:
INVENTOR
M. P. Ryder
BY
ATTORNEYS.

UNITED STATES PATENT OFFICE.

MALCOLM P. RYDER, OF WESTFIELD, NEW JERSEY.

ELECTRIC LAMP FOR VEHICLES.

SPECIFICATION forming part of Letters Patent No. 586,399, dated July 13, 1897.

Application filed September 10, 1896. Serial No. 605,363. (No model.)

*To all whom it may concern:*

Be it known that I, MALCOLM P. RYDER, of Westfield, in the county of Union and State of New Jersey, have invented a new and Improved Electric Lamp for Vehicles, of which the following is a full, clear, and exact description.

This invention relates to a novel electric lamp adapted for use on wheeled vehicles, and more particularly to serve as a headlight for a bicycle or the like.

The object of the invention is to provide a novel, simple, compact, and efficient electric headlight that will be adapted for the generation of electricity and illumination of the lamp by the progressive movement of the vehicle upon which the headlight is placed.

The invention essentially consists in the provision of a peculiarly-constructed electric generator of the magneto type, an incandescent lamp directly connected with the generator by means of a novel current-collector, and, furthermore, comprises novel means for actuating the electric generator from the tire of a wheel of the vehicle whereon the electric headlight is secured.

The invention also consists in certain specific details of construction and combinations of parts, as is hereinafter described, and pointed out in the claims.

Reference is to be had to the accompanying drawings, forming a part of this specification, in which similar characters of reference indicate corresponding parts in all the figures.

Figure 1 is a side view of the improved headlight, shown in place on a bicycle in part, indicated by dotted lines. Fig. 2 is a front elevation of the improved headlight in position for service. Fig. 3 is a plan view of the novel electric generator, the lamp being removed, said mechanism being clamped on a member of the front fork of a bicycle-frame, shown in section, taken substantially on the line 3 3 in Fig. 2. Fig. 4 is a sectional side view of the improved electric headlight supported on a portion of a bicycle-frame, the section being essentially on the line 4 4 in Fig. 2. Fig. 5 is a transverse sectional elevation of the electric generator, substantially on the line 5 5 of Fig. 1. Fig. 6 is a transverse sectional view of a portion of the electric generator, essentially on the line 6 6 in Figs. 3 and 5, showing the novel current-collecting device. Fig. 7 represents side views of detached parts that when assembled form the brush for the current-collector. Fig. 8 is a transverse partly-sectional view of the brush mechanism, essentially on the line 8 8 in Fig. 6. Fig. 9 is a plan view of the electric generator, having the lamp removed and clamped upon a fork member of a bicycle frame, showing a slightly-modified means for transmission of motion from the front bicycle traction-wheel to the electric generator; and Fig. 10 is a side elevation of the improved headlight, having the modification and seen in direction of arrow 1 in Fig. 9.

In exemplifying the application of the improved electric headlight for service on a bicycle, A indicates the front frame-fork of such a vehicle, on one member A' of which the improvements are removably secured, as will be hereinafter described.

The electric generator consists, essentially, of a compound armature having a core 10, formed of a series of iron plates, preferably notched on their side edges to provide flanges at each end of the said plates for retention of the insulated conductor-wire 11, that when correctly wrapped upon the laminated core practically completes the armature.

The plates of the core 10 are centrally perforated to permit them to be mounted upon and secured to the shaft 12, as shown in Figs. 4 and 5.

The armature is supported to rotate by an engagement of journaled end portions of the shaft 12 with suitable bearings formed at the ends of the case 13, that is of a mainly cylindric form and completely incloses the armature, suitable oil-cups being provided, as usual, for proper lubrication of the shaft-journals, as shown in Fig. 5.

There is a compound permanent magnet 14, provided as a field-magnet, said magnet being of the well-known horseshoe type and composed of a series of magnetized-steel plates having like form and dimensions. These magnet-sections being arranged to contact with each other laterally are united by transverse bolts 14$^a$, the heels of the sections having like polarity being imposed one upon the other, whereby a powerful permanent magnet is produced.

The limbs of the compound magnet 14 are curved near their ends, as best shown in Fig. 4, so as to adapt them to lie opposite and near the peripheral surface of the armature when the latter is introduced between said limbs, and the magnet is held in proper relation to the armature by its attachment to the end walls of the case 13, as shown in the drawings. Said construction for the limbs of the permanent magnet affords ample area for establishment of an adequate field of force between the field-magnet and armature, which is a prime essential for the proper generation of electricity in the dynamo.

In order to reduce weight, obtain maximum efficiency, and enable the construction of the electric lamp to be effected at a low cost, the several thin plates which compose the layers of the compound field-magnet 14 are cut by suitable dies from thin sheet-steel, and their inner edges near the poles of the magnet are scalloped to produce concaves of equal degree, thus affording a very cheap as well as effective permanent magnet when the component layers are secured together, as before explained.

On the shaft 12, adjacent to one end of the case 13 and within the latter, a ring-like current-collector is located.

The current-collector comprises an annular insulating-block 15, that is affixed upon the shaft 12 and has an electrical collecting-band 16 secured upon its periphery. The wound insulated wire 11 on the armature-core 10 has one of its bared ends $b$ electrically connected with the current-collecting band 16, and its other terminal $a$ is electrically joined to the core 10.

The electrolier or incandescent lamp used as a part of the improved electric headlight is composed of the usual pear-shaped glass bulb $c$, that contains the carbon filament $c'$, said bulb being cemented within a central aperture formed to receive it in the insulating-block $d$.

There is a coniform-shaped hood $e$ detachably held on the periphery of the block $d$ by finger-springs $e'$, that forcibly bear upon the coniform rear end of said block, thereby establishing a reliable connection between the hood at its rear end and the insulating-block $d$, and at the flaring front end of the hood a plano-convex lens $e^2$ is affixed for diffusion of light emitted by the electric lamp.

The lamp complete may be placed on other portions of the bicycle or the like, but to render the entire device compact and convenient in application to such a vehicle it is preferred to mount and secure the same upon the electric generator, as shown in the drawings.

As represented, the hood $e$ of the lamp is clamped, as at $e^3$, upon the field-magnet 14 at such an angle with regard to the same as will best adapt said lamp for an effective distribution of light at the front of the vehicle.

There is a simple device provided for taking current from the collecting-band 16 and transmitting the electricity therefrom to the carbon of the incandescent lamp. Said transmitting medium, as shown, has its members separated from each other in Fig. 7 and assembled for service in Figs. 6 and 8, the same consisting of a brush-holder $g$, formed of insulating material in the shape represented, it being a substantially rectangular block channeled on the normally front face and having a curved bottom wall, from which the sides produced by the channel forwardly project in parallel planes.

The holder-block $g$ has a perforated boss $g'$ centrally formed on its rear face, which boss engages a suitably-formed perforation in the case 13, passing through from the inner side of the latter, as shown in Fig. 6.

The brush proper consists of a strip or plate of elastic sheet metal that is a good electric conductor bent to provide two spaced limbs $h$ thereon, that are separated by the integral transverse spacing member $h'$, as shown at the left in Fig. 7, and the limbs mentioned are normally spread apart more at the free ends to facilitate their application upon the band 16, as will be further explained.

The spacing member $h'$ is centrally perforated for the reception of the clamping-screw $i$, that is first inserted through the insulating-washer $i'$, then through the perforated boss of the holder-block $g$, and then through the member $h'$ of the double-limbed brush.

There is a nut $i^2$ placed on the threaded end of the screw $i$, and said nut is located between the parallel flanges of the holder-block $g$, that prevent it from turning.

An electric conducting-wire $k$ has one end clamped upon the washer $i'$ by the head of the screw $i$ and thence extends to one of the binding-screws $d'$, that clamp it to a leading-in wire in electric connection with one end of the filament $c'$ of carbon in the lamp-bulb $c$. It is to be understood that for efficient action a similar leading-in wire on the other end of the carbon loop is in a like manner clamped by a similar binding-screw upon one end of a conducting-wire $k'$, that extends for connection with a part of the case 13, as at $k^2$, to establish an electric circuit between the lamp and electric generator.

It will be seen that when the limbs $h$ of the brush are placed in position so as to loosely contact with the band 16 at opposite points thereon the adjustment of the clamping-screw $i$ so as to draw the nut $i^2$ against the member $h'$ of the brush will cause the latter to bend and conform to the concave surface of the bottom wall of the holder-block $g$, which will obviously draw the limbs $h$ into forcible contact with the band 16 and so perfect the electric contact of said limbs therewith.

The improved electric headlight that has been described is preferably arranged to receive motion for actuation of the generator by securing the latter upon one member $A'$ of the frame-fork $A$, as before mentioned, the means of connection allowing the entire headlight to rock on suitable supports and be spring-pressed toward the elastic tire B of the front wheel of the bicycle.

It is essential that the device for attachment of the elastic headlight upon the bicycle-frame be constructed to permit the lamp to be held in a manner which will enable the rider to light the lamp at will or extinguish the same and also to readily remove the generator and lamp from the bicycle when this is necessary.

To effect the results mentioned, the following-described details of construction are preferably employed: On each end wall of the case 13 the similar arms $13^a$ are projected therefrom in parallel planes at the normally rear side of the generator, and said limbs are joined by the two transverse bars $m$ $m'$, that are secured thereto by their ends, a suitable space intervening the said bars, as shown in the drawings, $m'$ being the rear bar of the pair.

A clamping-band 17 is fitted to embrace the front frame-fork member $A'$ and is adapted for a clamped engagement therewith by the adjustment of the bolt $n$, having the nut $n'$, the bolt engaging perforations in the end portions of the clamp, whereby the pair of parallel limbs $17^a$, forwardly projected from the clamping-band, are held in a correct position above and at one side of the pneumatic tire B. The limbs $17^a$ are spaced apart such a relative degree as will permit them to pass between and loosely contact with the inner surfaces of the arms $13^a$.

A slot $o$ is formed in each limb $17^a$ at a correct distance from the free ends thereof, and hooks $o'$ are produced on said ends.

The longitudinally-disposed slots $o$ are intersected by notches cut from the upper edges of the limbs and which form openings near the longitudinal centers of said slots, so that two hooks $o^2$ $o^3$ are thus provided at each slot $o$, which hooks project toward each other on each limb $17^a$.

The space between the transverse bars $m$ $m'$ is so proportioned to that which intervenes the front hooks $o'$ and rear hooks $o^3$ on the limbs $17^a$ that the bar $m'$ may be first loosely entered through the notches in said limbs and then be slid below the hooks $o^3$, which will dispose the other bar $m$ behind the hooks $o'$ with which this bar may be interlocked if the headlight is moved forward sufficiently to locate the bar $m'$ beneath the ends of the hooks it is engaged with, as clearly shown in Fig. 4.

When the bars $m$ $m'$ and hooks $o'$ $o^3$ are engaged as has been explained, the arms $13^a$ on the generator-case 13 will be so held on the limbs $17^a$ of the clamp 17 that the generator and lamp thereon will be stably maintained, and in effect the headlight is supported as if on a rigid bracket.

On the end portion of the armature-shaft 12 that when in position is projected directly above the tire B a friction-pulley $12^a$ is secured, and the peripheral face of said pulley is held away from the tire B when the bars $m$ $m'$ are engaged with the hooks $o'$ $o^3$, as before mentioned. On the cross-bar $m'$, which is near the free end of the arms $13^a$, a presser-spring 18 is mounted, which spring is formed of a single strand of spring-wire and bent, as best shown in Figs. 3 and 9.

In construction of the spring 18 it will be seen that a concave bearing portion $p$ is formed by bending the wire strand at its longitudinal center, which part $p$ in service has contact with the front edge of the fork member $A'$. From the portion $p$ the wire is bent so as to project two parallel members toward the cross-bar $m'$, whereon said members are coiled to form spiral springs $p'$, and thence two limbs $p^2$ project toward the generator and have resilient pressure on the field-magnet 14.

It will be seen that the force of the spring 18 is adapted to press the headlight toward the tire B, when the connection of parts is adjusted to permit such a movement. To this end the arms $13^a$ and cross-bars $m$ $m'$ are moved by the manipulation of the headlight, so as to move the bar $m'$ toward the rear ends of the longitudinal slots $o$, which will remove the bar $m$ from engagement with the hooks $o'$. The headlight may now be rocked upward, so that the bar $m$ will be above the hooks $o'$, and then the headlight should be drawn forwardly to locate the bar $m'$ beneath the hooks $o^2$ that are at the front ends of the slots $o$, and it will be evident that the stress of the spring 18 will now be permitted to press the pulley $12^a$ forcibly upon the tire B, which will adapt the latter to communicate rapid rotary motion to the electric generator when the bicycle is in motion, which will cause an incandescence of the carbon in the lamp.

It will be apparent from the construction and arrangement of parts that the rotation of the armature-shaft 12 in either direction will cause the generation of electricity, and the generator may be considered as belonging to the alternating type of dynamos. Hence the movement of the bicycle or other vehicle whereon the improvement is placed will cause the lamp to shed light if the vehicle is run forward or backward. In some cases it may be found advantageous to hold the headlight rigidly on its supports and provide means for driving the pulley $12^a$, that is then removed from the tire of the driving-wheel. Such means is shown in Figs. 9 and 10, and comprises an arm 19, loosely mounted at one end upon the shaft 12 at the side of the pulley $12^a$.

On the outer side and near the outer end of the arm 19 a friction-pulley 20 is pivoted, having such a relative diameter as will allow its periphery to contact with the face of the pulley $12^a$ and also with the tire B.

The rockable pulley 20 may have an elastic periphery, so as to insure a proper bite upon the tire and on the pulley $12^a$, that may also be faced with gum or leather.

The arm 19 is spring-pressed toward the tire B by a spring 21, supported from the case 13, either as represented or by any other available means.

Should it be desired to release the headlight from the frame of the bicycle, it is only necessary that the cross-bar $m'$ be moved so as to take it out of the slots $o$ of the limbs $17^a$, which will permit a ready detachment of the entire device from the clamp on the bicycle-frame in an obvious manner.

In applying the improved electric headlight to a vehicle other than a bicycle—as, for example, a road-cart or a four-wheeled passenger conveyance—it is apparent that the electric generator, of any suitable capacity, may be located at a desired point on the vehicle, so as to be driven by a traction-wheel thereof. The lamp or a pair of lamps can be placed where the light is to be shown and have electric connection by wires established with the generator, so that the improved headlight may be utilized for lighting on the exterior of a vehicle or within the closed body of the same, if such service is desired.

Having thus described my invention, I claim as new and desire to secure by Letters Patent—

1. The combination with a vehicle, of a magneto-electric generator supported to rock on projections from the frame of the vehicle, and a spring having limbs projecting oppositely from an integral coil thereon, that engages with the generator-support and is thus held in place, said spring pressing limbs thereof at one side of its coil upon the vehicle-frame, and opposite ends of the spring against the generator for its rocking depression, as specified.

2. The combination with the front frame-fork of a bicycle, and a pair of notched parallel arms clamped thereon, of a magneto-electric generator from which projects a pair of arms, connected by cross-bars that are adapted to rest in and interlock with the notches in the clamped arms, and a spring intermediately coiled on one of said cross-bars, having one extremity pressed against the frame-fork, and the other end portions contacting with the field-magnet of the electric generator, as specified.

3. In a magneto-electric generator, a current-transmitter, comprising the two-limbed brush, said limbs being spaced apart by a transverse member, means to draw the limbs of said brush toward each other by bending their spacing member and thus enforce their contact upon a current-collector ring, and electric connections extending from the generator to a lamp and return, for completion of an electric circuit, substantially as described.

4. The combination with the front frame-fork of a bicycle, and a pair of parallel arms clamped thereon, said arms having two pairs of opposite longitudinal slots all notched open on upper sides, of a magneto-electric generator, parallel arms extending from said generator, two spaced cross-bars engaged at ends with the arms of the generator and intermediately hooked in the slots of the clamped arms, the cross-bars being adapted by longitudinal adjustment to lock the electric generator projected from the frame-fork, and by a changed adjustment permit said generator to receive rocking movement, and a spring coiled on one cross-bar having its ends pressing the frame-fork and the generator so as to rock the latter downwardly, as specified.

5. In a magneto-electric generator of the construction described, a current-transmitter comprising an elastic-limbed brush held in an insulating holder-block by a central screw and a nut held from turning by the flanges of the holder-block, said brush having enforced contact with a current-collector ring forming part of the electric generator, substantially as described.

6. The combination of a support a revolving member thereon, a device driven by contact with the said revolving member said device being pivoted to the support and movable toward and from the said revolving member, and a spring having an intermediate coil embracing the pivot of the said device one end of the spring pressing the support and the second end of the spring pressing the said device whereby the device is held in coöperative relation to the revolving member, substantially as described.

7. The combination of an arm having two hooks pointing toward each other and located inward from the end of the arm, a second arm, and two bars carried on the second arm, the one of said bars being capable of locking with either hook of the first arm and the second of said bars being capable of engaging the first arm to assist in holding the two arms in rigid connection and being also capable of moving with the second arm to swing clear of the first arm, substantially as described.

8. The combination of an arm having two hooks pointed toward each other and also having a third hook at the outer portion of the arm and pointed inward, a second arm and two bars fixed thereon, the one bar being capable of engaging with either of the first-named hooks and the second bar being capable of engaging with the remaining hook, substantially as described.

9. The combination of one arm with two hooks pointed toward each other and with a third hook pointed inward from the outer portion of the arm, a second arm, two bars carried by the second arm, the first bar coacting with the two first-named hooks and the second bar coacting with the third hook, and a spring attached to the first bar at a point intermediate of the spring and having its terminals respectively actuating the arms, substantially as described.

MALCOLM P. RYDER.

Witnesses:
A. A. HOPKINS,
WM. P. PATTON.